(12) United States Patent
Ehrlich (10) Patent No.: US 7,722,112 B2
(45) Date of Patent: May 25, 2010

(54) COMPOSITE PANEL FOR A TRAILER WALL (75) Inventor: Rodney P. Ehrlich, Monticello, IN (US)

(73) Assignee: Wabash National, L.P., Lafayette, IN (US)

( * ) Notice: Subject to any disclaimer, the term of this patent is extended or adjusted under 35 U.S.C. 154(b) by 258 days.

(21) Appl. No.: 11/859,014

(22) Filed: Sep. 21, 2007

(65) Prior Publication Data

US 2008/0111393 A1    May 15, 2008

Related U.S. Application Data

(60) Provisional application No. 60/827,080, filed on Sep. 27, 2006.

(51) Int. Cl.
*B60N 99/00* (2006.01)
(52) U.S. Cl. .................................................. 296/186.1
(58) Field of Classification Search .............. 296/186.1, 296/186.5
See application file for complete search history.

(56) References Cited

U.S. PATENT DOCUMENTS

| | | | |
|---|---|---|---|
| 3,420,023 A | 1/1969 | Gregori |
| 3,617,351 A | 11/1971 | Long |
| 4,578,297 A | 3/1986 | Duncan |
| 4,701,369 A | 10/1987 | Duncan |
| 4,708,757 A | 11/1987 | Guthrie |
| 4,709,781 A | 12/1987 | Scherzer |
| 4,796,397 A | 1/1989 | Capaul |
| 4,940,279 A | 7/1990 | Abott et al. |
| 5,186,996 A | 2/1993 | Alts |
| 5,275,848 A | 1/1994 | Mito et al. |
| 5,604,021 A | 2/1997 | Wagner |
| 5,698,308 A | 12/1997 | Sumiya et al. |
| 5,718,965 A | 2/1998 | Shiroeda et al. |
| 5,779,847 A | 7/1998 | Groeger |
| 5,851,342 A | 12/1998 | Vydra et al. |
| 5,860,693 A | 1/1999 | Ehrlich |
| 5,997,076 A | 12/1999 | Ehrlich |
| 6,007,890 A | 12/1999 | DeBlander |
| 6,080,495 A | 6/2000 | Wright |

(Continued)

FOREIGN PATENT DOCUMENTS

JP     03-87461     4/1991

(Continued)

*Primary Examiner*—Lori L Lyjak
(74) *Attorney, Agent, or Firm*—Barnes & Thornburg LLP (57) ABSTRACT

A composite panel of a wall of a trailer has inner and outer skins and a core material positioned between and secured to the skins. The core material defines or includes a plurality of voids which extend vertically along a height of the core material. At a plurality of points in a cross-section taken along the height of the core material, the core material is secured to both the skins. Alternatively, at any point in a cross-section taken along the height of the core material, the core material is secured to at least one of the skins. The voids through the composite panel provide a vent path from an interior of the trailer to an exterior of the trailer when top ends of the voids are separated from the top rail of the trailer and when bottom ends of the voids are separated from the bottom rail of the trailer.

16 Claims, 5 Drawing Sheets

U.S. PATENT DOCUMENTS

| | | |
|---|---|---|
| 6,199,939 B1 | 3/2001 | Ehrlich |
| 6,220,651 B1 | 4/2001 | Ehrlich |
| 6,368,721 B1 | 4/2002 | Watanabe et al. |
| 6,383,559 B1 | 5/2002 | Nakamura et al. |
| 6,412,854 B2 | 7/2002 | Ehrlich |
| 6,638,636 B2 | 10/2003 | Tucker |
| RE38,508 E | 4/2004 | Wright |
| 6,986,546 B2 | 1/2006 | Ehrlich |
| 7,014,253 B2 | 3/2006 | Oren |
| 7,056,567 B2 | 6/2006 | O'Neill et al. |
| 7,069,702 B2 | 7/2006 | Ehrlich |
| 2002/0098341 A1 | 7/2002 | Schiffer et al. |
| 2002/0109377 A1 | 8/2002 | Ehrlich |
| 2002/0176960 A1 | 11/2002 | Nadezhdin et al. |
| 2003/0186029 A1 | 10/2003 | Ogawa et al. |
| 2004/0217631 A1 | 11/2004 | Ehrlich |
| 2005/0225118 A1 | 10/2005 | Oren |
| 2006/0028050 A1 | 2/2006 | Ehrlich |
| 2007/0004813 A1 | 1/2007 | Shelby et al. |
| 2007/0056687 A1 | 3/2007 | Brinner |

FOREIGN PATENT DOCUMENTS

| | | |
|---|---|---|
| JP | 2003-285397 | 10/2003 |
| JP | 2005-238622 | 9/2005 |
| WO | 93/00845 | 1/1993 |

COMPOSITE PANEL FOR A TRAILER WALL

CROSS-REFERENCE AND INCORPORATION BY REFERENCE

This application claims the domestic priority of U.S. Provisional Application Ser. No. 60/827,080, filed on Sep. 27, 2006, and entitled "Composite Panel For A Trailer Sidewall". U.S. Provisional Application Ser. No. 60/827,080 is hereby incorporated by reference in its entirety.

FIELD OF THE INVENTION

The present invention generally relates to walls for trailers. More specifically, the present invention relates to walls for trailers being formed of a plurality of composite panels having sections of the core members of the composite panels removed or not provided in order to provide vertically extending voids along the height of the composite panels.

BACKGROUND OF THE INVENTION

The use of composite panels, namely those have inner and outer thin metal skins and a continuous core material provided therebetween, have become widely used in the formation of trailer walls because they are strong and lightweight. Both of these properties are important in the formation of trailer walls. The walls must be strong enough to prevent or substantially inhibit damage to the goods being shipped or stored within the trailer. The walls must also be lightweight because trailers including their payload are subjected to weight restrictions when traveling, such that the lighter the weight of the trailer is, the heavier the weight of the payload can be. Obviously, the larger the payload, the better.

Thus, it is desirable to provide composite panels for trailer walls that are even more lightweight, such that the payload to be shipped by the trailer can be even larger, but without compromising the strength and structural integrity of the trailer walls. The present invention provides such a composite panel for a trailer wall.

It is further desirable for a trailer wall to provide a vent path from an interior of the trailer to an exterior of the trailer such that fluid build-up, namely moisture build-up within the trailer, can vent out of the trailer. The present invention provides such a trailer wall.

SUMMARY OF THE INVENTION

Briefly, and in accordance with the foregoing, the invention provides a composite panel for use in a trailer wall. The composite panel has inner and outer metal skins with each skin having a top end and a bottom end. The composite panel also has core material positioned between and secured to the inner and outer skins. The core material has a predetermined height extending from a top end of the core material to a bottom end of the core material. The core material defines or includes a plurality of voids. Each void extends generally vertically along the height of the core material such that each void is open to the top end of at least the inner skin and the bottom end of at least the outer skin.

In a preferred embodiment of the invention, at a plurality of points in a cross-section taken along the height of the core material, the core material is secured to both the inner and outer skins. In an alternative embodiment of the invention, at any point in a cross-section taken along the height of the core material, the core material is secured to at least one of the inner and outer skins.

The composite panel of the invention allows provides for a composite panel that is lighter in weight than prior art composite panels. The composite panel of the invention also provides for a vent path from an interior of the trailer to an exterior of the trailer when the top end of the core material of the composite panel is separated from the top rail of the trailer and when the bottom end of the core material of the composite panel is separated from the bottom rail of the trailer.

BRIEF DESCRIPTION OF THE DRAWINGS

The features of the invention which are believed to be novel are described in detail hereinbelow. The organization and manner of the structure and operation of the invention, together with further objects and advantages thereof, may best be understood by reference to the following description taken in connection with the accompanying drawings wherein like reference numerals identify like elements in which.

DETAILED DESCRIPTION OF THE ILLUSTRATED EMBODIMENTS

While this invention may be susceptible to embodiment in different forms, there is shown in the drawings and will be described herein in detail, specific embodiments with the understanding that the present disclosure is to be considered an exemplification of the principles of the invention, and is not intended to limit the invention to that as illustrated.

Figure 1:
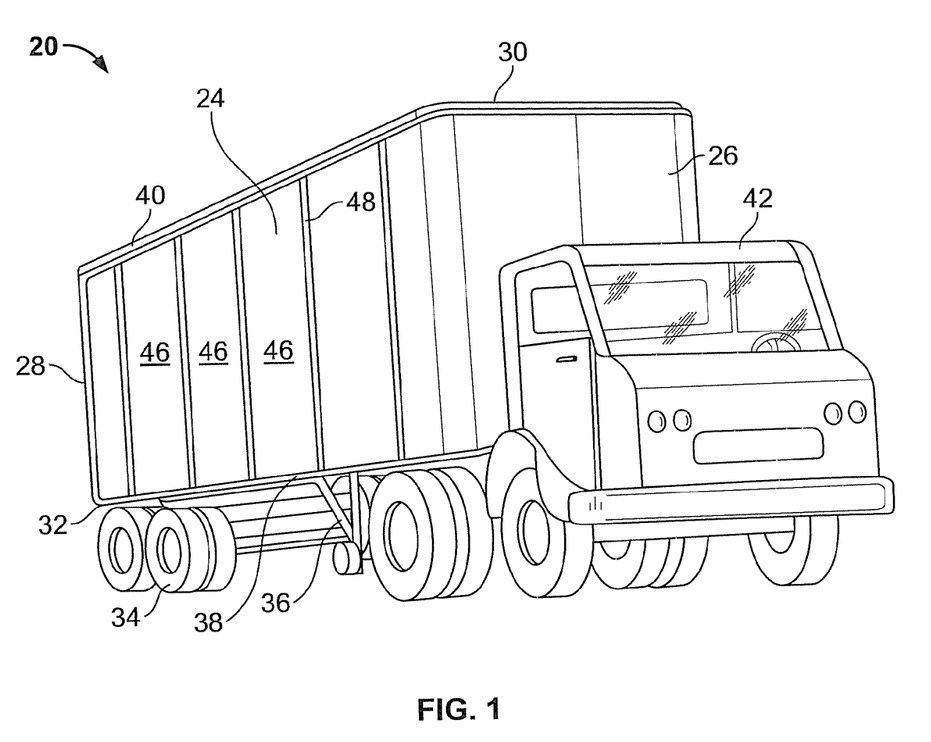
FIG. 1 is a perspective view of a trailer which incorporates a wall having panels formed in accordance with features of the present invention.

As illustrated in FIG. 1, a trailer 20 includes a body 22 formed from a pair of rectangular sidewalls 24, a front wall 26, rear frame and doors 28, a roof structure 30, and a floor structure 32. The rear of the floor structure 32 is supported by a conventional rear undercarriage assembly 34 and the front of the floor structure 32 has a landing gear 36 secured thereunder. The floor structure 32 and a lower portion of each sidewall 24 are secured to a respective bottom rail 38 which extends the length of the trailer 20. The bottom rails 38 are preferably formed of aluminum, which may be extruded. The roof structure 30 and an upper portion of each sidewall 24 are secured to a respective top rail 40 which extends the length of the trailer 20. The top rails are preferably formed of aluminum, which may be extruded. The trailer 20 can be connected to a tractor 42 by conventional means, such as a fifth wheel assembly.

The sidewalls 24 are identical, and, as such, only one of the sidewalls 24 is described. The sidewall 24 is formed from a plurality of composite panels 46 which are joined together at joints 48.

Figure 2:
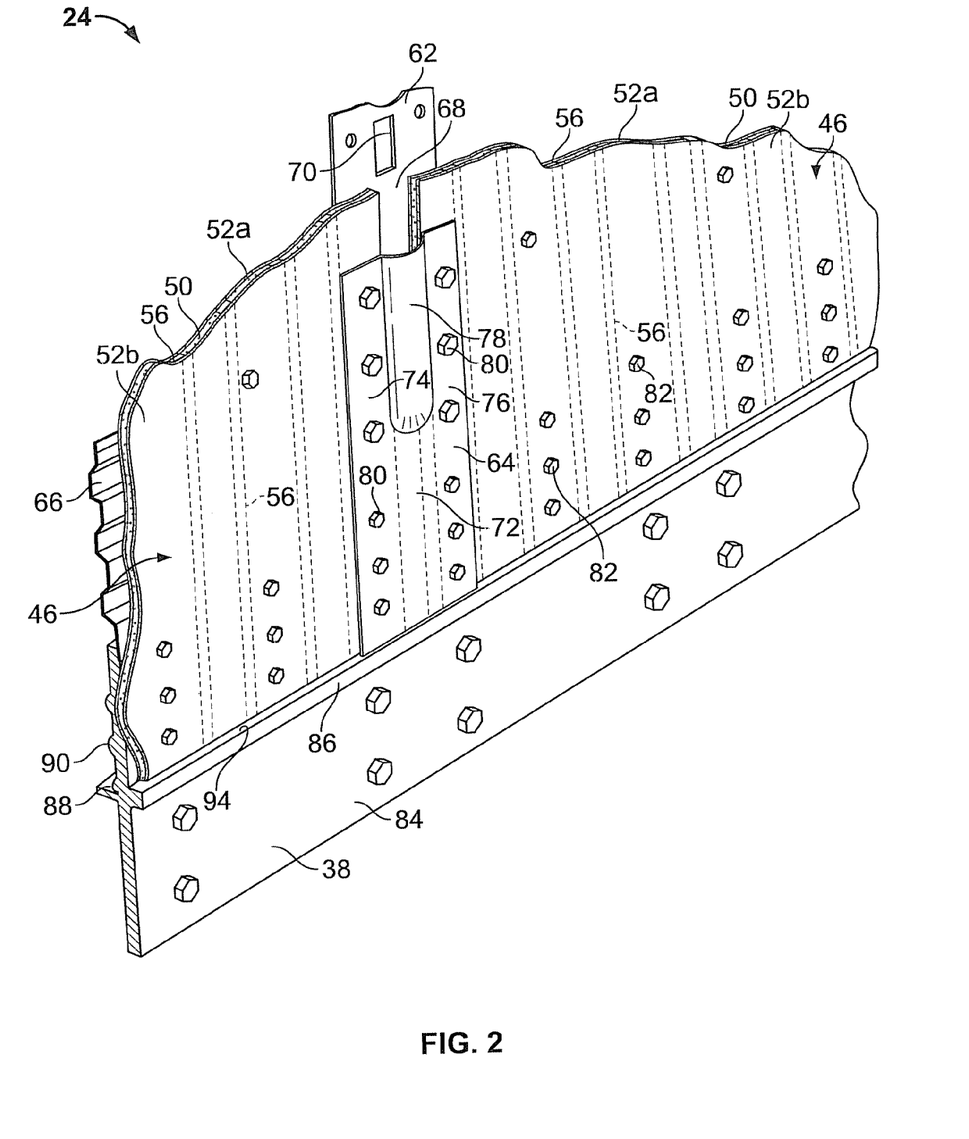
FIG. 2 is a partial perspective of the wall of FIG. 1.
Figure 6:
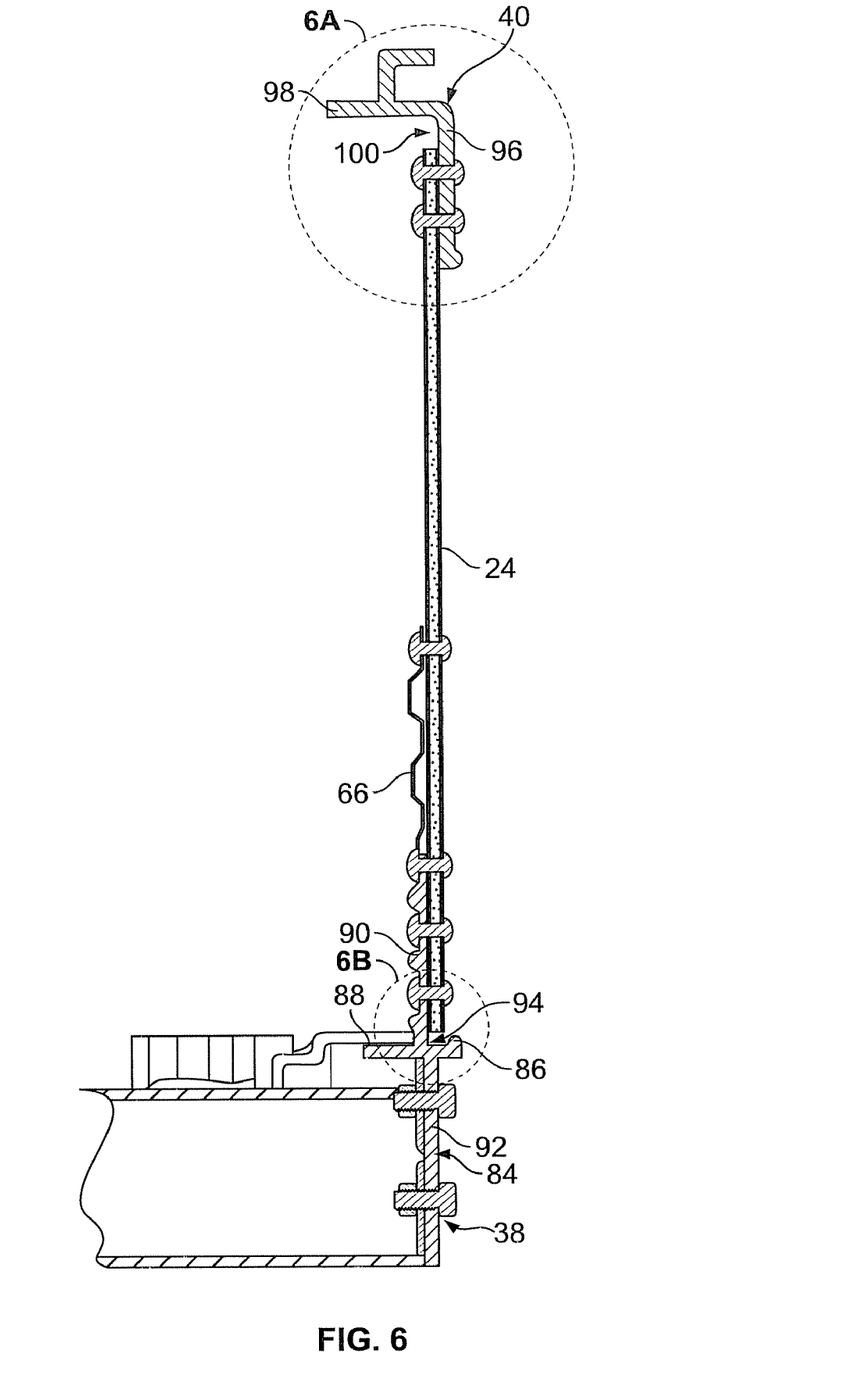
FIG. 6 is a cross-sectional view of a wall of the trailer, showing the top and bottom rails and a portion of the floor structure.

As best shown in FIG. 2, each composite panel 46 includes a core member 50 sandwiched between an inner thin skin 52a and an outer thin skin 52b and bonded thereto by a suitable known adhesive or other like means. The inner skin 52a and the outer skin 52b may be formed of metal, preferably aluminum or steel, and can range in thickness (such as 0.013 to 0.026 for steel skins and 0.050 inches for aluminum skins) or may be a thin composite material and can range in thickness (such as 0.026). It is to be understood that other thicknesses may be used as required by the application. Typically, each composite panel 46 is four feet in width, but can be longer or shorter depending on the application. At least two panels 46 are joined together to form the sidewall 24 of the body 22. The inner and outer skins 52a, 52b have top ends 54a, 54b and bottom ends 55a, 55b. In a preferred embodiment, as best illustrated in FIG. 6, the top ends 54a, 54b are planar and the bottom ends 55a, 55b are planar.

Figure 6A:
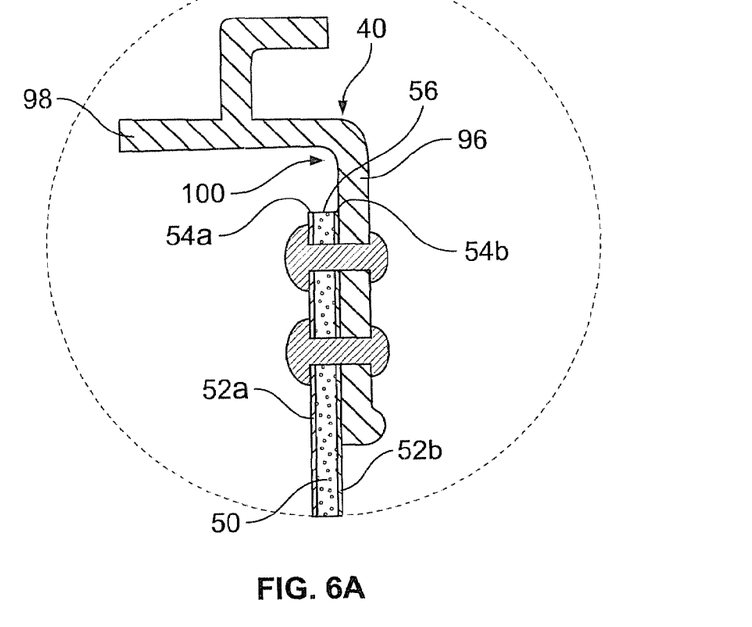
FIG. 6A is an enlargement of a portion of the cross-sectional view of the wall of the trailer taken from within the Circle 6A of FIG. 6.
Figure 6B:
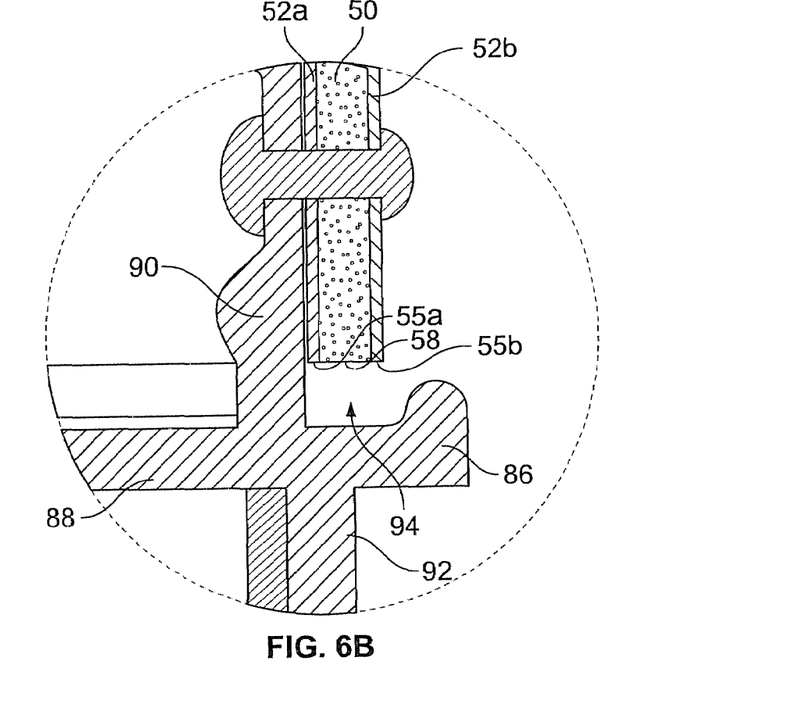
FIG. 6B is an enlargement of a portion of the cross-sectional view of the wall of the trailer taken from within the Circle 6B of FIG. 6.

Each core member 50 is made of some type of compressible non-metal material, preferably thermoplastic, such as polypropylene or high density polyethylene. Because composite panels 46 are used, the weight of the trailer construction is reduced over trailers having metal sidewalls. The core member 50 has a height defined between a top end 56 thereof and a bottom end 58 thereof. In a preferred embodiment, the top end 56 of the core member 50 is planar with the top ends 54a, 54b of the skins 52a, 52b, as best illustrated in FIG. 6A, but may be offset from one or both of the top ends 54a, 54b of the skins 52a, 52b. Likewise, in a preferred embodiment, the bottom end 58 of the core member 50 is planar with the bottom ends 55a, 55b of the skins 52a, 52b, as best illustrated in FIG. 6B, but may be offset from one or both of the bottom ends 55a, 55b of the skins 52a, 52b.

The weight of the core member 50 is further reduced because a plurality of sections of the core member 50 have been removed or are not provided in the original construction of the panel 46. Therefore, the core member 50 defines or includes a plurality of vertically extending voids 56 which are preferably provided along the height of the core member 50 from the top end 56 thereof to the bottom end 58 thereof, and thus the panel 46, but may extend along only a substantial portion of the height of the panel 46, for instance when an end 56, 58 of the core member 50 is offset from the ends 54a, 54b, 55a, 55b of the skins 52a, 52b. The void 56 is preferably continuous along its height and is open to at least one of the top ends 54a, 54b of the skins 52a, 52b and to at least one of the bottom ends 55a, 55b of the skins 52a, 52b. This reduces the weight of the panel 46, and thus the sidewall 24, without sacrificing important structural integrity.

Figure 3:
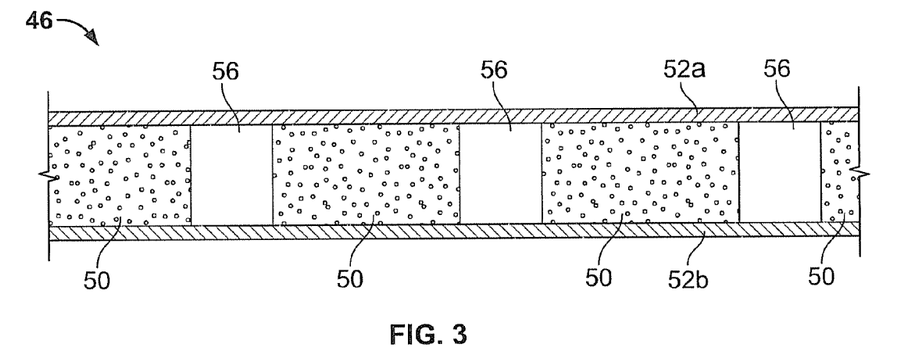
FIG. 3 is a cross-sectional view of the wall panel shown in FIG. 2 and illustrating the voids provided in the wall panel.

As shown in FIGS. 2 and 3, in a preferred embodiment, the voids 56 extend the full distance between the skins 52a, 52b, such that the core member 50 is discontinous along the length of the panel 46. Preferably each void 56 is approximately 0.5 inches in length (in the direction from the front of the trailer 20 to the rear of the trailer 20), and the discontinuous sections of the core member 50 between adjacent voids 56 are approximately 1.5 inches in length. Therefore, the voids 56 are formed generally two inches on center. The voids 56 may have straight sides as shown, may be curved or may take other forms. Thus, as best illustrated in FIG. 3, in a cross-section taken along the height of the core member 50, the core member 50 is secured to both the inner and outer skins 52a, 52b, but in a cross-section taken along the height of the void 56, the core member 50 is not secured to either the inner or outer skins 52a, 52b.

Figure 4:
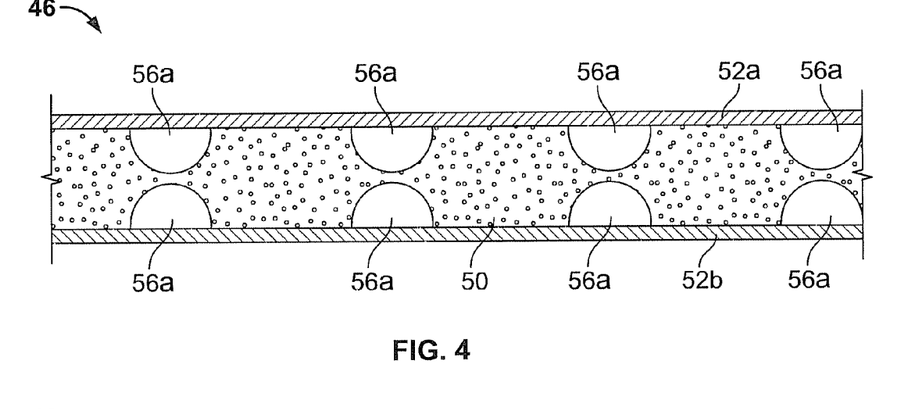
FIG. 4 is a cross-sectional view of a first alternative embodiment of the wall panel and illustrating the configuration of the voids provided in the first alternative embodiment of the wall panel.
Figure 5:
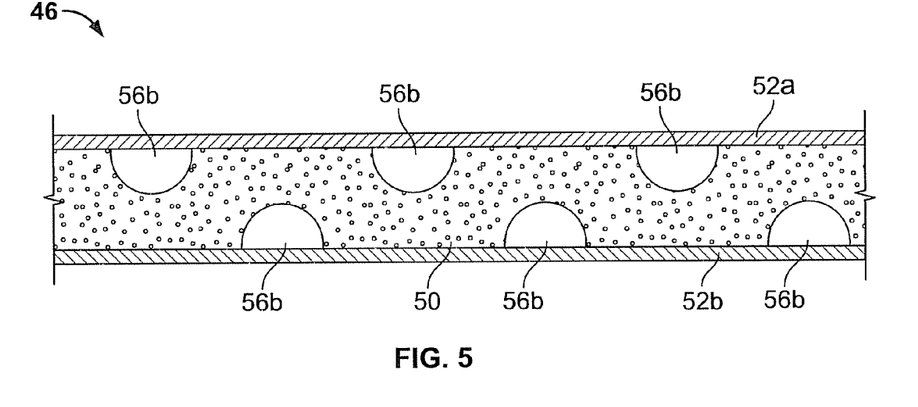
FIG. 5 is a cross-sectional view of a second alternative embodiment of the wall panel and illustrating the configuration of the voids provided in the second alternative embodiment of the wall panel.

As shown in FIGS. 4 and 5, the core member 50 may define or include other vertically extending voids 56a, 56b of differing configurations. As shown, these voids 56a, 56b are hemispherical, but may take other shapes.

In FIG. 4, pairs of voids 56a are formed adjacent to each other to form a generally hour-glass shape, with one void 56a being provided between the inner skin 52a and the core member 50 and the other void 56a being provided between the outer skin 56b and the core member 50. The voids 56a in each pair may intersect each other, but are preferably separate such that the core member 50 continuously extends along a length of the composite panel 46, such that the pair of voids 56a are discontinuous between the skins 52a, 52b. Thus, in a plurality of points in a cross-section taken along the height of the core member 50, the core member 50 is secured to both the inner and outer skins 52a, 52b, but in a cross-section taken along the height of the voids 56a, the core member 50 is not secured to either the inner or outer skins 52a, 52b.

In FIG. 5, voids 56b are offset from each other and alternate between being provided between the inner skin 52a and the core member 50 and being provided between the outer skin 52b and the core member 50. The core member 50 continuously extends along a length of the composite panel 46 such that the offset and alternating voids 56b are discontinuous between the skins 52a, 52b. Thus, at any point in a cross-section taken along the height of the core member 50, the core member 50 is secured to at least one of the skins 52a, 52b. More particularly, when a cross-section is taken along the height of the core member 50 through the void 56b provided along the inner skin 52a, the core member 50 is secured to the outer skin 52b; when a cross-section is taken along the height of the core member 50 through the void 56b provided along the outer skin 52b, the core member 50 is secured to the inner skin 52a; when a cross-section is taken along the height of the core member 50 and not through any of the voids 56b, the core member 50 is secured to both the inner and outer skins 52a, 52b.

It is to be understood that the voids 56, 56a, 56b illustrated herein are merely exemplary and the voids may take other forms and shapes. Because the core member 50 defines or includes the voids 56, 56a, 56b, in order to ensure the structural integrity of the composite panel 46, the core member 50 preferably is secured to both the inner and outer skins 52a, 52b when a cross-section is taken from a plurality of points along the height of the composite panel 46, as illustrated in each of FIGS. 3-5. Alternatively, in order to ensure the structural integrity of the composite panel 46, the core member 50 is secured to at least one of the inner and outer skins 52a, 52b when a cross-section is taken from any point along the height of the composite panel 46, as illustrated in FIG. 5.

The joint 48 connects the ends of the adjacent composite panels 46. The joint 48 shown in FIG. 2 is exemplary, and it is to be understood that other joints can be provided for joining the panels 46.

As shown, the joint 48 includes an inner logistics member 62 and an outer logistics cap 64, sometimes called a splicing member, both of which are known in the art. The inner logistics member 62 is provided on the inside of the trailer 20 and may extend along the entire height of the panels 46 or may terminate at its lower end at scuff plate 66. The outer logistics cap 64 is provided on the outside of the trailer 20 and may extend along the entire height of the panels 46, or may terminate at the bottom and top rails 38, 40. The ends of the panels 46 are spaced apart from each other when joined by the joint 48 such that an air pocket 68 is formed between the inner logistics member 62 and the outer logistics cap 64.

The inner logistics member 62 is preferably, as shown, a flat plate having a plurality of spaced apart openings or slots 70 therethrough along an intermediate portion of the inner logistics member 62. The slots 70 provide a means for which equipment can be engaged, for example by a clip or a hook, to the sidewall 24 of the trailer 20. The inner logistics member 62 may be formed from a heavier and stronger material than the material that is used for the inner and outer skins 52a, 52b to provide the sidewall 24 with strength and rigidity. The inner logistics member 62 sits against the inner skins 52a of the adjacent panels 46. The inner logistics member 62 bridges the gap between the panels 46 such that the slots 70 align with the air pocket 68 so that clips or hooks can be engaged with the slots 70.

The outer logistics cap 64, which is like a post, preferably sits against the outer skins 52b of the adjacent panels 46 and may extend under the bottom and top rails 38, 40 of the trailer 20, or may terminate at the bottom and top rails 38, 40. The outer logistics cap 64 preferably has a flat top portion (not shown), a flat bottom portion 72 and flat side portions 74, 76 which preferably lie against the outer surfaces of the adjacent outer skins 52b, and an intermediate portion 78 which bulges outwardly from the top, bottom and side portions 72, 74, 76. When the outer logistics cap 64 is joined with the outer skins 52b of the panels 46, the inner surfaces of the side portions 74, 76 lie against the planar outer skins 52b and the intermediate portion 78 bulges outwardly from the sidewall 24. The bulging intermediate portion 78 bridges the air pocket 68 formed between the panels 46 and aligns with the air pocket 68. The bulging intermediate portion 78 provides for more space within the air pocket 68 to allow for the attachment of members, such as clips or hooks, to the slots 70 of the inner logistics member 62.

The flat top portion and the flat bottom portion 72 of the outer logistics cap 64 facilitate connection of the panels 46 and prevent the entry of moisture into the interior of the trailer 20 through the air pocket 68. The upper end of the flat top portion may butt against the top rail 40, or the upper end of the flat top portion may sit underneath a portion of the top rail 40. The lower end of the flat bottom portion 72 may butt against the bottom rail 38, or the lower end of the flat bottom portion 72 may sit underneath a portion of the bottom rail 38.

The inner logistics member 62 and the outer logistics cap 64 are attached to the panels 46 by suitable means, such as rivets 80 as shown, and/or adhesives (not shown). The rivets 80 extend through the inner logistics member 62, the respective end sections of the adjacent panels 46 and the side portions 74, 76 of the outer logistics cap 64 and/or the scuff plate 66. The rivets 80 extend through the core member 50 of the panels 46. There is sufficient uninterrupted core member 50 between the voids 56, 56a, 56b to accommodate the rivets 80. The panels 46 and the scuff plate 66 are attached together by suitable means, such as rivets 82 as shown, and/or adhesives (not shown). The rivets 82 extend through the panels 46 and the scuff plate 66. The rivets 82 extend through the core member 50 of the panels 46. There is sufficient uninterrupted core member 50 between the voids 56, 56a, 56b, 56c to accommodate the rivets 82.

If desired, each end of the inner skins 52a of each panel 46 may have a side end section which is coined or stepped down with an intermediate section of each panel 46 remaining planar. The inner logistics member 62 may then be seated against the side end section so that the inner surface of the sidewall 24 is flush.

As best illustrated in FIGS. 6 and 6B, the base rail 38 is preferably formed of a vertical wall 84 having a generally horizontal flange 86 extending perpendicularly therefrom to an exterior of the trailer 20 and a generally horizontal flange 88 extending perpendicularly therefrom toward the interior of the trailer 20. The horizontal flanges 86, 88 divide the wall into an upper wall portion 90 and a lower wall portion 92. The floor structure 32 is attached to the flange 88 and the lower wall portion 92 in a conventional manner. The upper wall portion 90 sits against an inner surface of the inner skins 52a of the panels 46, proximate to the bottom ends 55a thereof. The scuff plate 66 may overlap the upper wall portion 90 on the interior or exterior side thereof, may terminate at the upper end of the upper wall portion 90, or may be integrally formed with the upper wall portion 90. In a preferred embodiment, the bottom ends 55a, 55b, 58 of the skins 52a, 52b and the core member 50 are preferably slightly spaced from the horizontal flange 86 such that a small gap 94 is provided therebetween.

As best illustrated in FIGS. 6 and 6A, the top rail 40 preferably has an L-shaped wall having a vertical wall portion 96 which sits against an outer surface of the outer skins 52b of the panels 46, proximate to the top ends 54b thereof, and a horizontal wall portion 98 which is attached to the roof structure 30. In a preferred embodiment, the top ends 54a, 54b, 56 of the skins 52a, 52b and the core member 50 are preferably spaced from the horizontal wall portion 98 such that a gap 100 is provided therebetween.

As a result of this construction, a vent path is provided in the sidewall 24 of the trailer 20. Fluids, typically moisture build-up in the trailer 20, can flow through from the interior of the trailer 20, into the gap 100, through the voids 56, 56a, 56b in the sidewall 24, and out the gap 94 to the exterior of the trailer 20.

It is to be understood that while the present invention is described with respect to the trailer sidewalls 24, the panels 46 could be used in the formation of the front wall 26, the rear doors 28, or a rear wall if rear doors are not provided.

While preferred embodiments of the invention are shown and described, it is envisioned that those skilled in the art may devise various modifications without departing from the spirit and scope of the foregoing description, the attached drawings and the appended claims.

The invention is claimed as follows:

1. A composite panel for use in a trailer wall comprising:
   inner and outer metal skins, each said skin having a top and bottom end; and
   core material positioned between and secured to said inner and outer skins, said core material having a predetermined height extending from a top end of said core material to a bottom end of said core material, a plurality of voids provided between said core material and at least one of said inner and outer skins, each said void extending generally vertically along the height of said core material such that each said void is open to said top end of said inner skin and said bottom end of said outer skin;
   wherein at a plurality of points in a cross-section taken along the height of said core material, said core material is secured to both said inner and outer skins.

2. The composite panel as defined in claim 1, wherein each said void continuously extends between said inner and outer skins.

3. The composite panel as defined in claim 1, wherein said core material continuously extends along a length of said composite panel, thereby providing discontinous voids between said inner and outer skins.

4. The composite panel as defined in claim 3, wherein said discontinuous voids include a first void which is provided between said inner skin and said continuous core material and a second void which is provided between said outer skin and said continuous core material.

5. A composite panel for use in a trailer wall comprising:
inner and outer metal skins, each said skin having a top and bottom end; and
core material positioned between and secured to said inner and outer skins, said core material having a predetermined height extending from a top end of said core material to a bottom end of said core material, a plurality of voids provided in said core material, each said void extending generally vertically along the height of said core material such that each said void is open to said top end of said inner skin and said bottom end of said outer skin;
wherein at any point in a cross-section taken along the height of said core material, said core material is secured to at least one of said inner and outer skins.

6. The composite panel as defined in claim 5, wherein at least one of said plurality of voids is provided between said core material and said inner skin.

7. The composite panel as defined in claim 5, wherein at least one of said plurality of voids is provided between said core material and said outer skin.

8. A wall for a trailer comprising:
a top rail having an L-shaped wall including a vertical wall portion and a horizontal wall portion, said horizontal wall portion of said top rail extending outwardly from said vertical wall portion of said top rail to an interior of the trailer;
a base rail having an L-shaped wall including a vertical wall portion and a horizontal wall portion, said horizontal wall portion of said base rail extending outwardly from said vertical wall portion of said base rail to an exterior of the trailer; and
at least one composite panel, each said composite panel comprising,
inner and outer metal skins having upper and lower ends and upper and lower end portions, said lower end portion of said inner skin being secured to said vertical wall portion of said base rail, said upper end portion of said outer skin being secured to said vertical wall portion of said top rail, said lower end of said outer skin being separated from said horizontal wall portion of said base rail such that a first gap is provided therebetween, said upper end of said inner skin being separated from said horizontal wall portion of said top rail such that a second gap is provided therebetween,
core material positioned between and secured to said inner and outer skins, said core material having a predetermined height extending from a top end of said core material to a bottom end of said core material, a plurality of voids provided between said core material and at least one of said inner and outer skins, each said void extending generally vertically along the height of said core material such that each said void is open to said upper end of said inner skin and said lower end of said outer skin and such that each said void is in communication with said first and second gaps, thereby providing a vent path from the interior of the trailer to the exterior of the trailer,
wherein at a plurality of points in a cross-section taken along the height of said core material, said core material is secured to both said inner and outer skins.

9. The wall as defined in claim 8, wherein a pair of composite panels are provided, and further comprising means for joining said pair of composite panels together.

10. The wall as defined in claim 8, wherein each said void continuously extends between said inner and outer skins.

11. The wall as defined in claim 8, wherein said core material continuously extends along a length of said composite material, thereby providing discontinuous voids between said inner and outer skins.

12. The wall as defined in claim 11, wherein said discontinuous voids include a first void which is provided between said inner skin and said continuous core material and a second void which is provided between said outer skin and said continuous core material.

13. A wall for a trailer comprising:
a top rail having an L-shaped wall including a vertical wall portion and a horizontal wall portion, said horizontal wall portion of said top rail extending outwardly from said vertical wall portion of said top rail to an interior of the trailer;
a base rail having an L-shaped wall including a vertical wall portion and a horizontal wall portion, said horizontal wall portion of said base rail extending outwardly from said vertical wall portion of said base rail to an exterior of the trailer; and
at least one composite panel, each said composite panel comprising,
inner and outer metal skins having upper and lower ends and upper and lower end portions, said lower end portion of said inner skin being secured to said vertical wall portion of said base rail, said upper end portion of said outer skin being secured to said vertical wall portion of said top rail, said lower end of said outer skin being separated from said horizontal wall portion of said base rail such that a first gap is provided therebetween, said upper end of said inner skin being separated from said horizontal wall portion of said top rail such that a second gap is provided therebetween,
core material positioned between and secured to said inner and outer skins, said core material having a predetermined height extending from a top end of said core material to a bottom end of said core material, a plurality of voids provided in said core material, each said void extending generally vertically along the height of said core material such that each said void is open to said upper end of said inner skin and said lower end of said outer skin and such that each said void is in communication with said first and second gaps, thereby providing a vent path from the interior of the trailer to the exterior of the trailer,
wherein at any point in a cross-section taken along the height of said core material, said core material is secured to at least one of said inner and outer skins.

14. The wall as defined in claim 13, wherein a pair of composite panels are provided, and further comprising means for joining said pair of composite panels together.

15. The wall as defined in claim 13, wherein at least one of said plurality of voids is provided between said core material and said inner skin.

16. The wall as defined in claim 13, wherein at least one of said plurality of voids is provided between said core material and said outer skin.

* * * * *